March 17, 1970 O. BAADE 3,501,703

CIRCUIT ARRANGEMENT FOR A SINGLE OR MULTI-FREQUENCY SIGNAL RECEIVER, OPERATING WITH A SPEECH IMMUNITY CIRCUIT AND LIMITING THE SIGNALS RECEIVED

Filed May 4, 1967 2 Sheets-Sheet 1

INVENTOR,
OTTO BAADE

3,501,703
CIRCUIT ARRANGEMENT FOR A SINGLE OR MULTI-FREQUENCY SIGNAL RECEIVER, OPERATING WITH A SPEECH IMMUNITY CIRCUIT AND LIMITING THE SIGNALS RECEIVED

Otto Baade, New South Gate, London, England, assignor to International Standard Electric Corporation, New York, N.Y., a corporation of Delaware Filed May 4, 1967, Ser. No. 636,101
Claims priority, application Germany, May 12, 1966, St 25,382
Int. Cl. H04b 1/10, 15/00
U.S. Cl. 328—165 2 Claims

ABSTRACT OF THE DISCLOSURE

A speech immunity circuit is presented for discriminating desired dial pulse signals at voice frequencies from undesirable signals formed by the human voice, and for retransmitting the desired dial pulse signals free of undesirable signals.

The invention relates to a circuit arrangement for a single or multi-frequency signal receiver, operating with a speech immunity circuit for limiting the signals received to desired voice-frequency pulses while eliminating other erroneous voice-frequency signals.

In the transmission of signals for the establishment of telephone connections, AC tones within the range of voice frequencies are sometimes used. When using such voice frequencies for dial signals, it may happen that erroneous signals in the same frequency range will be formed by the human voice and injected into the system because both the dial signals and speech are transmitted over the same telephone lines. Although it is conventional to switch off the microphone of the subscriber set when emitting the individual dial signals, the danger of imitating signals by speech nevertheless exists. For example, voice signals may be introduced if the microphone is switched on again between two succeeding signals.

For these reasons, it is necessary to apply measures providing protection against erroneous information, that is to check whether, besides the desirable signal frequency or signal frequency combination, other frequencies are on the line, which exceed an admitted minimum voltage. In such cases the receivers for the signals must be blocked, i.e., a so-called speech immunity circuit must be made effective.

The German patent specification No. 1,002,032 shows an arrangement separating the frequencies via a bridge-type circuit. One bridging branch is formed by a series resonant circuit, tuned to the signal frequency. From this branch the signal frequency, too, is derived. The blocking voltage is tapped in the zero or neutral branch of the bridge-type arrangement. The high speech immunity of this arrangement is obtained however by an expensive circuit arrangement, particularly by the transformer-repeaters required for coupling out the signals.

The German patent specification 1,069,693 discloses a circuit arrangement in which a resonant circuit is provided to separate the frequencies of the input signal, whereby the signal tones and blocking frequency tones are led to separate repeaters. At the outputs of the repeaters the voltages are rectified through Graetz-rectifiers and led to a Schmitt-trigger as differential voltage. The patent specification does not show the arrangement of the resonant circuit and does not indicate whether the input signal is limited. From FIG. 1 of this patent specification, it may be gathered that, in the circuit arrangement, two separate amplifiers are provided for the signal frequency and the blocking frequency, respectively and, moreover, according to FIG. 2, two separate repeaters U1 and U2. This is considered an increased expenditure compared with the present invention.

The German printed application No. 1,146,137 corresponding to the U.S. patent to Beyerle, No. 3,242,267 shows a speech-immunity signal receiver equipped with a wide band preamplifier as control or variable amplifier and a limiter circuit, consisting of two diodes. The disadvantage resulting from the practical construction of this arrangement is the changing curve of the output signal, depending on the height of the input level, in consequence of which the portion of the base wave is reduced at an increasing input level when limiting said wave, meaning with regard to the following selective circuit a reduction of the band width. A definite effective operating band width of the receiver is mandatory due to variations in tolerances of the signal senders, or sources, that cannot be avoided.

It is an object of the invention to provide a circuit arrangement in which, within a wide range of level change in the input signal, the portion of the base wave of the output signal remains stable. This is achieved, according to the invention, by equipping the receiver to two limiters, the first one being connected with the input terminals of the receiver and the second one being connected in parallel with a frequency-selective circuit or circuits to the output of the first limiter. The second limiter has a limiting threshold, which is dependent on the level of the signals applied. By this measure the advantage of a constant characteristic curve of the output signal is obtained, independent of the level of the signal. This advantage would be possible in theory with one limiter only, however, in practice two limiters must be used, similar to the arrangement shown, if a defined level range of the input signal is admitted.

An advantageous feature of the invention is that the limiter connected in parallel with the frequency-selective circuit or circuits, consists of a Graetz-rectifier (DC bridge rectifier) with a R-C filter element in the neutral branch and that the DC voltage appearing at said R-C filter element is applied to the input of the evaluating element as threshold voltage for blocking said evaluating element.

The invention is now described with the aid of the accompanying drawings, wherein.

Figure 1:
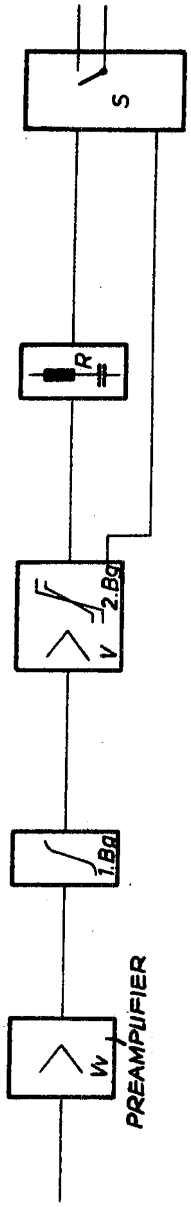
FIG. 1 shows a block diagram of the signal receiver.
Figure 2:
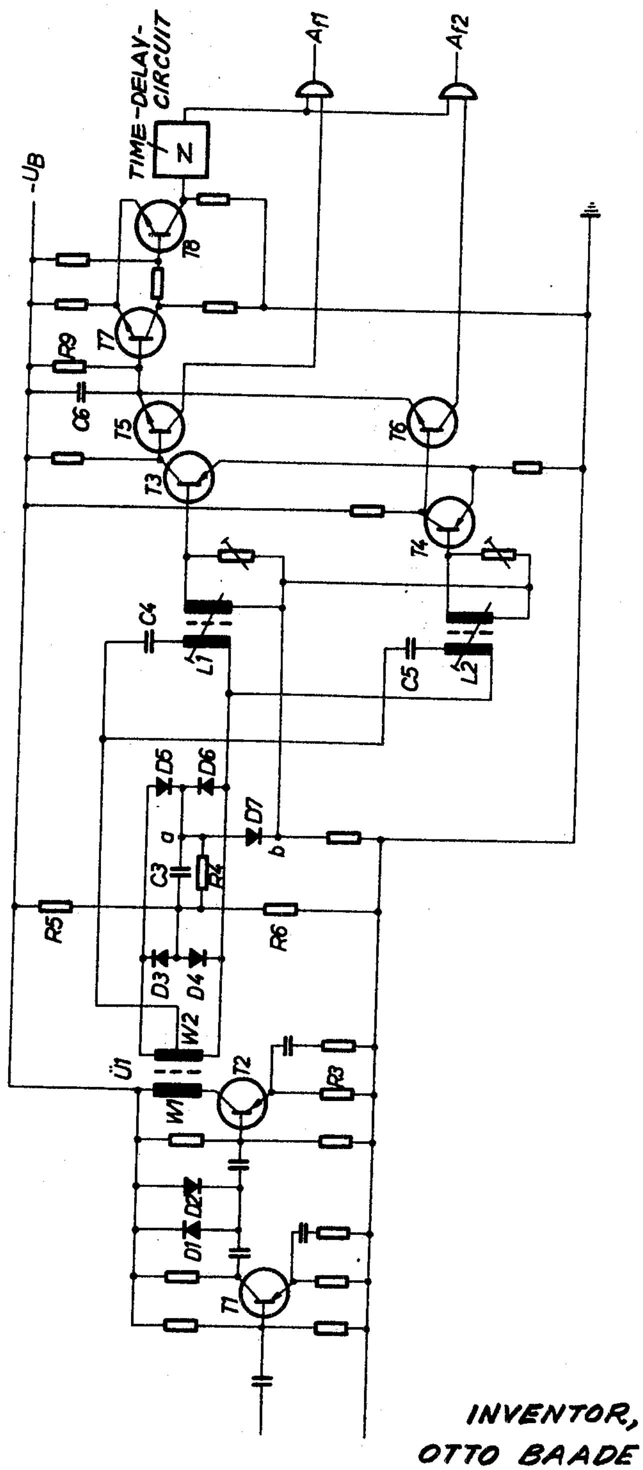
FIG. 2 shows the circuit arrangement of the signal receiver.

According to FIGS. 1 and 2 the arriving signals are led to a pre-amplifier $V_v$, having a first limiter, consisting of the diodes D1 and D2. The curve of the output signal at this first limiter depends heavily on the amplitude of the input signal due to the characteristic of the diodes. It changes from the sine shape at a small amplitude to a trapezoid shape and then to a rectangular shape; thereby the portion of the basic wave changes simultaneously, i.e. this portion becomes relatively smaller with increasing input level.

Figure 3:
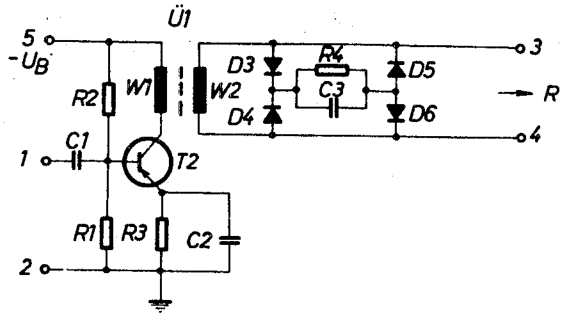
FIG. 3 shows an arrangement of an amplifier within a second limiter.

The foregoing disadvantages are avoided by adding another limiter with a threshold dependent on the input voltage. Such a limiter circuit is shown in FIG. 2 and separately in FIG. 3. The amplifier V, shown in the block diagram of FIG. 1 is formed in this example by a transistor T2, operating in the common emitter-mode, actuating through a repeater or transformer U1 the Graetz-rectifier circuit, including the diodes D3 to D6. The filter element consists of the resistor R4 and the capacitor C3. The selective circuit R is connected to the terminals 3 and 4. For the resistance of the winding W2 of the transformer U1, the relationship expressed by the formula $\omega L \gg R4$ applies within the frequency band to be handled.

If an AC voltage is applied to the terminals 1 and 2 (FIG. 3), the capacitor C3 is charged to a voltage $U_{c3}$, depending on R3 and on the input voltage at the terminals 1 and 2. If the AC portion of the collector current has the momentary value zero, the diodes D3 to D6 are blocked and the high inductive resistance of the primary winding W1 of repeater U1 is effective as collector resistance. A small change of the collector AC current therefore causes a big change of the collector voltage as long as the voltage at the winding W2 is lower than the voltage $U_{c3}$. If the value of $U_{c3}$ is reached the pair of diodes D3, D6 or D5, D4 becomes conductive, depending on the respective half wave, and switches the capacitor C3 and the resistor R4 in parallel to the winding W2. Thus the collector resistance becomes suddenly low-ohmic at a suitable value of C3, and even big changes of the collector current cause only small changes of the collector voltage. The voltage at the winding W2 is limited to the value of the voltage $U_{c3}$. Thereby, C3 must be selected so that within the desired frequency range $1/\omega C3$ is smaller than R4.

Figure 4:
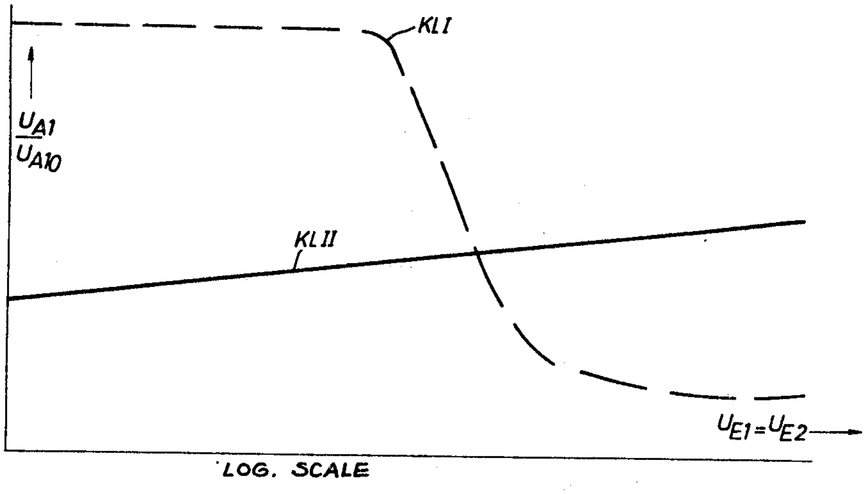
FIG. 4 shows the curve of the output voltages depending on the input voltage with and without a level-dependent limiter.

In FIG. 4 the speech immunity effect of a limiter with a defined threshold is compared with the speech immunity effect of the limiter just described. Two frequencies $f1$ and $f2$ of the same voltage lines are applied to both limiters. In the output circuit, the basic wave of frequency $f1$ was measured before $f2$ was applied. Thereafter, the basic wave of $f1$ was measured when $f2$ had been applied with the same level. FIG. 4 shows the ratio of these two values, depending on the input voltage. It is clearly perceivable by curve KLI that, for the limiter with a defined threshold, the speech immunity becomes effective only at a defined minimum input voltage; in the limiter with a level-dependent responding threshold, as indicated in curve KLII, the effect of the speech immunity is nearly independent of the level.

The characteristic KLI has been measured with a limiter having a defined threshold, the characteristic KLII with a limiter having a level-dependent threshold. The voltage $U_{A1}$ represents the voltage of the frequency $f1$ in the output circuit, if the input voltage consists of equal portions of the voltage $U_{E1}$ of frequency $f1$ and $U_{E2}$ of frequency $f2$. The output voltage $U_{A10}$ was measured when only the voltage $U_{E1}$ was applied at the input of the receiver.

Figure 5:
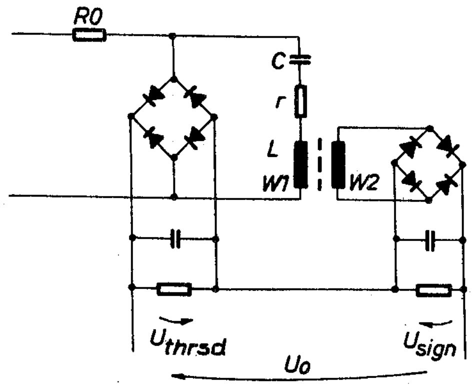
FIG. 5 shows a circuit arrangement in which the voltage, led to the evaluating element, is obtained as a differential voltage of the rectified total voltage and signal voltage.

FIG. 5 shows how to obtain the threshold voltage $U_{thrsd}$, produced in common by all frequencies appearing on the line, and how to gain the signal voltage $U_{sign}$. A differential voltage $U_0$ is formed out of both rectified voltages, which difference voltage is applied to the evaluating element. If the succeeding evaluating element switches at the zero point of the difference voltage the responding range only depends on the band width of the selective circuit with the elements C, R and L, but not on the level of the voltage. However, it is suitable to introduce a bias, not shown on the drawing, because the switching stages operate in general only when a defined voltage is applied.

The example shown in FIG. 2 deals with a receiver for two signal frequencies. A Schmitt-trigger is used as switching stage of the evaluating element, common for both frequencies. This Schmitt-trigger actuates a time-control device Z, releasing the outputs $A_{f1}$ and $A_{f2}$ only when a signal frequency has existed for a defined period. The above mentioned bias for the switching stage is derived from the voltage divider, consisting of the resistors R5 and R6, and possesses the same dependence of voltage as the responding threshold of the evaluating element. The threshold voltage can become effective only when the potential of point *a* at the RC element is more positive than the potential of point *b*, thereupon the diode D7 becomes conductive. The ground potential represents the blocking potential. It is thereby achieved that the receiver responds only when the input signal has reached a defined voltage.

The selective circuits L1, C4, and L2, C5 are connected in parallel to a tapping of the output winding of the repeater U1. The secondary windings of the inductivities L1, L2 tap with one end the bias at point *b*, with their other terminal they control the DC voltage amplifiers, consisting of the transistors T3 and T5, and T4 and T6, respectively, which transistors rectify the signal AC voltage. The filter element C6, R9 and the trigger are actuated through the emitters of the transistors T5 and T6. Through this actuation, the capacitor C6 is charged very quickly when a signal appears.

An extension to more frequencies is possible without difficulties, but the receiver can recognize only one frequency at a time, several frequencies would block each other.

While the principles of the invention have been described above in connection with specific apparatus and applications, it is to be understood that this description is made only by way of example and not as a limitation on the scope of the invention.

What is claimed is:

1. A circuit arrangement for a receiver having speech immunity means for limiting received signals comprising two limiters, means connecting the first limiter to input terminals of the receiver, and means connecting the second limiter in parallel with a frequency-selective circuit to output terminals of the first limiter, said second limiter having a limiting threshold dependent on the level of the signals applied.

2. A circuit arrangement as claimed in claim 1 in which the second limiter includes a Graetz-rectifier having an RC-filter circuit in a neutral branch, a source of DC voltage, and means applying said DC voltage to the RC filter circuit in order to establish a threshold level for the purpose of blocking potentials below that level.

References Cited

UNITED STATES PATENTS

| | | | |
|---|---|---|---|
| 2,282,271 | 5/1942 | Terroni et al. | 328—138 XR |
| 2,319,306 | 5/1943 | Dickieson | 179—84 |
| 2,537,998 | 1/1951 | Henquet et al. | 328—165 XR |
| 2,580,973 | 1/1952 | Sueur | 328—165 XR |
| 3,242,267 | 3/1966 | Beyerle | 179—84 |

JOHN S. HEYMAN, Primary Examiner

J. ZAZWORKSY, Assistant Examiner

U.S. Cl. X.R.

179—84; 307—237; 328—138, 171